Patented Oct. 11, 1938

2,133,008

UNITED STATES PATENT OFFICE 2,133,008

DICARBOXYLIC ACIDS AND PROCESSES OF PREPARING THE SAME

Anderson W. Ralston and Stewart T. Bauer, Chicago, Ill., assignors to Armour and Company, Chicago, Ill., a corporation of Illinois No Drawing. Application September 14, 1936, Serial No. 100,762

12 Claims. (Cl. 260—537)

This invention relates to processes of preparing dicarboxylic acids, and it comprises processes wherein an unsaturated fatty acid compound belonging to the group consisting of unsaturated fatty acids, glycerides thereof, and water soluble soaps thereof, is subjected to the action of an aqueous solution of an alkali metal hypochlorite in the presence of a hypochlorite-decomposing agent functioning to liberate oxygen from said hypochlorite, the amount of said agent being at least equal to the amount of fatty acid compound, and it further comprises processes wherein said fatty acid compound, together with chlorine, is passed into an aqueous alkaline solution containing a hypochlorite decomposing agent capable of liberating oxygen from hypochlorite, the amount of said agent being at least sufficient to oxidize said fatty acid compound with the formation of dicarboxylic acids.

The dicarboxylic acids, such as suberic, azelaic, and sebacic, have many important industrial uses, although at the present time the cost of producing these acids almost prohibits their wide use. For example, these aliphatic dicarboxylic acids are valuable materials in the manufacture of plastics and artificial resins. When reacted with polyhydroxy alcohols the dicarboxylic acids yield such plastics, and these artificial resins have many advantageous physical and chemical properties.

Synthetic methods of preparing the aliphatic dicarboxylic acids have not been very successful, with perhaps a few exceptions. And no satisfactory method has hitherto been available for making these acids from the extremely cheap and abundant unsaturated fats and fatty oils. Oleic acid, and its esters, occurs in lard and many other animal fats. Linolenic and linoleic acid are plentiful. The fish oils are available in huge quantities and they contain major quantities of highly unsaturated fatty acids in ester form.

For years it has been known that the bonds of unsaturation in fatty acids could be "oxidized" to give dicarboxylic acids. Unfortunately, however, no method of technical importance has been available for carrying out this general reaction. The various methods hitherto mentioned have been of only academic interest, the text-books merely stating that, when such acids are subjected to strong oxidizing agents "dicarboxylic acids" are formed. The actual yield thereof has only been large enough to show, by quantitative tests, that such oxidizing agents do split, or rupture, the double bond with the formation of dicarboxylic acids. But the amount thereof which can be isolated from the reaction product is so small as to be useless technically. Many other reaction products are formed, such as aldehydes, hydroxy fatty acids, etc.

In our Patent Number 2,033,538, we have described methods whereby unsaturated fatty acid compounds such as the free acids, and soaps thereof, can be converted to hydroxy fatty acids by the action of, in effect, metal peroxides of iron, cobalt, nickel, and others. In that process we react the fatty acid with sodium hypochlorite containing a hypochlorite-decomposing agent which acts to liberate oxygen from the hypochlorite. This oxygen apparently first reacts with the agent to form a highly reactive peroxide, the peroxide then decomposes to liberate oxygen which, in turn adds to the double bond in the unsaturated fatty acid to form an olefin oxide linkage. This linkage then hydrates with water to yield a dihydroxy derivative of the fatty acid. In that patent the amount of hypochlorite decomposing agent is quite small. Nickel nitrate is one suitable agent and an average quantity is five parts thereof to fifty parts of oleic or other unsaturated fatty acid.

We have now made the surprising discovery that, when the conditions of the aforesaid patent are made more drastic, as by markedly increasing the quantity of decomposing agent in the hypochlorite solution, we can carry the oxidizing reaction far beyond the formation of hydroxy fatty acids. We have descovered that, under those more drastic conditions, the unsaturated fatty acids undergo actual decomposition of the bond of unsaturation with the formation of dicarboxylic acids. Although we might, of course, have expected that more vigorous oxidizing conditions would result in a rupture at the points of unsaturation, we had no expectation that such vigorous oxidizing conditions would actually yield commercially useful quantities of dicarboxylic acids. For example, from oleic acid we have been able to obtain yields of azelaic and sebacic acid amounting to as much as sixty percent of the theoretical. This is a surprisingly large yield in comparison with the mere traces of dicarboxylic acids hitherto obtained in so-called oxidizing reactions.

Our process, in broad aspects is characterized by reacting an unsaturated fatty acid compound with metal peroxides formed from hypochlorites and hypochlorite-decomposing agents capable of liberating oxygen from such hypochlorites. There are a great many fatty acid compounds which can be subjected to our process for the formation of dicarboxylic acids therefrom. In general we find it best to start with the readily available fatty acids such as oleic, linoleic, linolenic and unsaturated fatty acids from fish oils. But other unsaturated fatty acids can be used. Thus, we can start with acrylic, crotonic, nonylenic, hexenic, angelic, and others.

Instead of using these acids in their free state we can start with esters thereof, and we can also start with water miscible soaps thereof, such as the sodium soaps. And in the appended claims we use the language "unsaturated fatty acid compound" to denote the free acids, their esters, and soluble soaps.

In many instances, in fact in most, the dicarboxylic acids obtained are not single, pure acids. Usually they are mixtures of two or more dicarboxylic acids. This unusual result can be readily explained. We predicate it on the fact that the position of double bonds in unsaturated fatty acids is prone to change in the presence of various reagents. Thus, catalysts such as metallic nickel are known to shift the position of the double bond in oleic acid to give iso-oleic acids which have different properties from oleic acids. A number of catalysts are known which modify the position of the double bond. So, in the case of oxidizing reactions which tend to split the double bond there is a marked tendency for the double bond to shift around so that its position, when oxidized, is not the same as it is in the original fatty acid starting material. This leads to the formation of mixtures of dicarboxylic acids, many of which are probably of unknown composition, especially when highly unsaturated fatty acids such as linoleic etc. are used. But even oleic acid will yield mixtures of dicarboxylic acids.

This peculiarity in the reaction is of no real consequence commercially since in most instances there is no necessity for obtaining individual pure acids. It is enough if high yields of mixtures can be obtained from the starting material. In making plastics, for example, we do not care whether the dicarboxylic acid is a pure chemical compound so long as it consists predominantly of dicarboxylic acids.

We shall now describe our invention with specific reference to the preparation of dicarboxylic acids from oleic acid, it being understood however, that the various other starting materials referred to above can also be used.

As stated, our process is characterized by using hypochlorite-decomposing agents in conjunction with chlorine and an alkali metal hydroxide. Consequently, as a first step in our process we find it advantageous to prepare a solution containing the highly reactive oxidizing agent resulting from the reaction between the hypochlorite and the decomposing agent. This agent, which functions to liberate oxygen from the hypochlorite, can be any metal compound which, when treated with a hypochlorite solution, is converted to a metal peroxide. The more common metal compounds which function in this manner are compounds of iron, cobalt, manganese and nickel, and of them, nickel is the most advantageous.

Thus, in this first step, we dissolve 50 parts by weight of nickel nitrate and 80 parts by weight of sodium hydroxide in 1000 parts by weight of water. This mixture is cooled to a temperature of about 20° C. and then chlorine gas is passed in for about an hour, until the solution turns an inky black. This color change indicates the formation of nickel peroxide, $Ni_2O_7$. The actual reaction is probably quite complex, but it doubtless consists first in the conversion of the caustic soda to sodium hypochlorite, the decomposition thereof by nickel oxide (formed by reaction of NaOH with the $Ni(NO_3)_2$) whereby nascent oxygen is liberated which in turn forms the peroxide, and the constant regeneration of fresh sodium hypochlorite by the chlorine. Consequently, at the inky black stage our solution contains sodium hypochlorite and nickel peroxide.

We then slowly add 28 parts by weight of oleic acid without, however, stopping the flow of chlorine into the mixture. Since the reaction mixture is alkaline, or at least contains no free acid, there is no tendency for the formation of chlorhydrins. During the addition of the oleic acid the temperature is allowed to rise to about 25° C. After all the oleic acid has been added, the solution is heated to boiling under a reflux for a period of about four hours, chlorine being continuously added. During this stage, the nickel peroxide breaks down to liberate free oxygen, the oxygen first converts the double bond in the oleic acid to a dihydroxy grouping, then the alkyl chain splits at this point and the

group oxidizes to a carboxylic acid group. We consider that to be the reaction but do not wish to be bound by such explanation. Meanwhile, the nickel oxide formed as one end product decomposes more hypochlorite to form more peroxide, and the chlorine introduced regenerates the hypochlorite. Thus, the nickel compound can be looked upon as an oxygen carrier.

At this point, apparent similarity between the present process and that described in our Patent 2,033,538 may be noticed. However, we wish to again emphasize the great distinction between that process and the present one. It is to be noted that in the instant case we are using many times more nickel decomposing agent. In the aforesaid patent the ratio is about 5 parts of nickel nitrate to 50 parts of oleic acid, and, as stated therein, increase in the quantity of the nickel nitrate up to 15 or 20 parts offers no advantage. On the other hand, in the present example, the ratio of nickel nitrate to oleic acid is 50 to 28. In other words, the quantity of nickel nitrate or other decomposing agent exceeds the quantity of oleic acid. Consequently the conditions in our present invention are much more drastic.

At the completion of the heating period mentioned above, a small amount of sodium thiosulfate is added to the reaction mixture to remove any free chlorine, and then the solution is acidified with sulfuric or other suitable inorganic acid. This leads to the formation of an oily layer which is separated off. This oily layer will contain some monocarboxylic acids and other by-products of the reaction. The aqueous lower layer is concentrated somewhat, to about 25 percent of its former volume, and at this stage considerable sodium sulfate precipitates, if sulfuric acid has been used as the acidifying agent. The solution is then filtered, the filtrate made alkaline with a small amount of sodium hydroxide, and the dicarboxylic acids precipitated as their calcium salts by the addition of calcium chloride. Or, if desired, the free acids may be obtained by extracting a weakly acidified solution of the dicarboxylic acids with ether. In the present example, the yield amounts to about 12 parts by weight of dicarboxylic acids, mainly azelaic and sebacic. This is about 60 percent of theoretical.

In another example, we partially hydrogenate fish oil so that its highly unsaturated character is reduced somewhat but the fish oil is still unsaturated. The free fish oil fatty acids have an iodine number of 78.8. A solution of 30 parts of nickel nitrate, 10 parts (by weight) of sodium hydroxide, and 500 parts of water by weight is chlorinated as in the preceding example and then 10 parts by weight of the partially hydrogenated fish oil fatty acids are added together with chlorine. After heating for two hours and treatment with a small amount of sodium thiosulfate the reaction mixture is acidified, the oily layer thus liberated separated off, and the aqueous residue concentrated somewhat and extracted with ether. The dicarboxylic acids obtained consist of a mixture of acids having a melting point of 70° C. to 90° C. Those dicarboxylic acids obtained from oleic acid melt at 106° C. to 132° C.

Instead of starting with the free fatty acids we can start with the alkali metal soaps thereof, or with the esters thereof such as the glycerides. But we find it more advantageous to use the free acids.

In general, the quantity of hypochlorite-decomposing agent will be equal to, or exceed the quantity of unsaturated fatty acid. The exact quantity may, of course, vary with the acid treated and the kind of decomposing agent, but the proper amount can be readily determined by a simple test on a small batch of the fatty acid.

Having thus described our invention what we claim is:

1. The process of preparing dicarboxylic acids which comprises reacting an unsaturated fatty acid compound belonging to the group consisting of unsaturated fatty acids, glycerides thereof, and alkali metal soaps thereof, with an aqueous solution of an alkali metal hypochlorite in the presence of a hypochlorite-decomposing agent functioning to liberate oxygen from said hypochlorite to form a peroxide with said agent, the amount of said agent being at least equal to the amount of said fatty acid compound.

2. The process as in claim 1 wherein the agent is a metal compound chosen from the group consisting of iron, cobalt, manganese and nickel compounds.

3. The process as in claim 1 wherein the agent is nickel oxide.

4. The process of preparing dicarboxylic acids which includes the step of reacting oleic acid with an aqueous solution of an alkali metal hypochlorite in the presence of a hypochlorite-decomposing agent functioning to liberate oxygen from said hypochlorite to form a peroxide with said agent, the amount of said agent being at least equal to the amount of oleic acid.

5. The process as in claim 4 wherein the agent is a metal compound chosen from the group consisting of iron, cobalt, manganese and nickel compounds.

6. The process as in claim 4 wherein the agent is nickel oxide.

7. The process of preparing dicarboxylic acids which comprises passing chlorine into an aqueous solution of an alkali metal hydroxide containing a hypochlorite-decomposing agent functioning to liberate oxygen from alkali metal hypochlorite, whereby a metal peroxide is formed in said solution, and then passing chlorine and an unsaturated fatty acid compound belonging to the group consisting of unsaturated fatty acids, glycerides thereof, and alkali metal soaps thereof, into said solution, the amount of said hypochlorite-decomposing agent being at least equal to the amount of said fatty acid compound.

8. The process as in claim 7 wherein the agent is a metal compound chosen from the group consisting of iron, cobalt, manganese and nickel compounds.

9. The process as in claim 7 wherein the agent is nickel oxide.

10. The process of preparing dicarboxylic acids which comprises passing chlorine into an aqueous solution of an alkali metal hydroxide containing a hypochlorite-decomposing agent functioning to liberate oxygen from alkali metal hypochlorites, whereby a metal peroxide is formed in said solution, and then passing chlorine and oleic acid into said solution, the amount of said hypochlorite-decomposing agent being at least equal to the amount of said oleic acid.

11. The process as in claim 10 wherein the agent is a metal compound chosen from the group consisting of iron, cobalt, manganese and nickel compounds.

12. The process as in claim 10 wherein the agent is nickel oxide.

ANDERSON W. RALSTON.
STEWART T. BAUER.